United States Patent
Lin et al.

(10) Patent No.: US 6,466,137 B1
(45) Date of Patent: Oct. 15, 2002

(54) APPARATUS AND METHOD FOR REMOTE CONVENIENCE MESSAGE RECEPTION WITH ADJUSTABLE PULSE DETECTION RECEIVER PORTION

(75) Inventors: Xing Ping Lin, Waterford; Kurt Alan Perski, Northville, both of MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/255,321

(22) Filed: Feb. 23, 1999

(51) Int. Cl.$^7$ .......................... G08C 19/00; H04L 7/00; H04B 17/00; B60R 25/00; B27B 21/00
(52) U.S. Cl. .................. 340/825.69; 340/825.5; 455/226.3; 307/10.2; 83/745
(58) Field of Search .................. 340/825.69, 825.62, 340/825.72; 455/226.22, 352, 355; 377/80, 37; 375/317

(56) References Cited

U.S. PATENT DOCUMENTS

| | | | | |
|---|---|---|---|---|
| 5,193,210 A | * | 3/1993 | Nicholas et al. ......... | 455/226.3 |
| 5,600,323 A | | 2/1997 | Boschini | |
| 6,078,269 A | * | 6/2000 | Markwell et al. ........ | 340/825.5 |
| 6,079,309 A | * | 8/2000 | Hayes et al. ................. | 83/745 |
| 6,100,603 A | * | 8/2000 | Gold ......................... | 307/10.2 |
| 6,100,814 A | * | 8/2000 | Doyle | |
| 6,265,987 B1 | * | 7/2001 | Wang et al. ............ | 340/825.69 |

* cited by examiner

Primary Examiner—Michael Horabik
Assistant Examiner—Mai Nguyen
(74) Attorney, Agent, or Firm—Tarolli, Sundheim, Covell, Tummino & Szabo L.L.P.

(57) ABSTRACT

A receiver/controller unit (14) of a remote convenience system (10) receives an electromagnetic signal (18). The signal (18) is comprised of a plurality of pulses that convey a remote convenience function request. In response to the receipt of the signal (18), the receiver/controller unit (14) causes performance of the requested function. The receiver/controller unit (14) has a comparator (82). A first input of the comparator (82) is connected to receive an electrical signal (78) with an electrical characteristic that varies to convey the remote convenience function request. A second input of the comparator (82) is connected to receive a signal 86 that has a threshold electrical characteristic value. Preferably, the electrical characteristic is voltage amplitude. An output of the comparator (82) provides a signal indicative of the occurrence of the electrical characteristic of the electrical signal (78) exceeding the threshold value, and that conveys the remote convenience function request. A microprocessor (100) adjusts the threshold electrical characteristic value.

16 Claims, 2 Drawing Sheets

_US 6,466,137 B1_

APPARATUS AND METHOD FOR REMOTE CONVENIENCE MESSAGE RECEPTION WITH ADJUSTABLE PULSE DETECTION RECEIVER PORTION

FIELD OF THE INVENTION

The present invention relates to remote convenience systems, and is particularly directed to systems that include an adjustable pulse detection receiver.

BACKGROUND OF THE INVENTION

Remote convenience systems are known in the art. Such remote convenience systems permit remote control of certain functions. One example type of a remote convenience system is for remotely controlling vehicle functions. Other example types of remote convenience systems include garage door opener systems and entry light activation systems. Focusing on the remote convenience vehicle systems, remotely controlled vehicle functions include locking and unlocking functions of one or more vehicle doors. A remote convenience system that permits remote locking and unlocking is commonly referred to as a remote keyless entry system. Such remote convenience vehicle systems may provide for control of other vehicle functions. For example, a remote vehicle locator function may be provided. The vehicle locator function causes a horn to emit a horn chirp and/or the headlights of the vehicle to flash "ON". This allows a person to quickly locate their car within a crowded parking lot.

Known remote convenience vehicle systems include a receiver/controller unit mounted in an associated vehicle and at least one portable hand-held transmitter unit located remote from the receiver/controller unit. Each transmitter unit is provided with one or more manually actuatable switches. Each switch is associated with a vehicle control function to be performed. The transmitter unit includes circuitry that responds to the actuation of one of the switches to transmit a function request message, along with a security code, in the form of a digital signal. A signal that is received by the receiver/controller unit is processed such that the vehicle performs the requested function.

The remote convenience systems operate in the ultrahigh frequency (UHF) portion of the radio frequency (RF) spectrum. Specifically, the signals from the transmitter units are in the UHF portion of the spectrum that is allocated by the United States Federal Communications Commission (FCC) for unlicensed transmission devices. FCC regulations stipulate that such unlicensed devices cannot have a transmitted signal strength that exceeds a preset maximum. Some countries other than the United States only permit very low levels of transmitted power. The transmitted power level in these countries is lower than the permitted level in the United States. For example, in Japan, remote convenience transmitter units have typical transmission power levels 30 dB below that of a typical United States remote convenience transmitter unit. In addition, within the United States, FCC regulations stipulate that the unlicensed devices must not cause undo radio interference and must operate despite the presence of any radio interference.

Often, it is desirable to accomplish remote control performance of certain functions at a longest possible distance. One example of such a function that is performed at the longest possible distance is the remote vehicle locator function. To illustrate such a scenario, consider a shopping mall patron exiting a shopping mall building and being faced with the task of visually locating their car within a vast shopping mall parking lot. It will be beneficial to be able to actuate the remote vehicle locator function from a location near the exit door of the shopping mall, before proceeding into the parking lot.

In order for a receiver/controller unit located within the associated vehicle to receive a low power signal, the receiver/controller unit must have a high sensitivity and must have a high ability to differentiate the signal from any noise.

Another issue which presents itself for remote convenience systems is that the type of the circuitry hardware that is used within the receiver/controller unit is often dependent upon the type of signal that is transmitted from the associated transmitter unit. Specifically, if the transmitted signal contains a pulse string that has a duty cycle that is approximately fifty percent, the receiver/controller unit typically includes an average detector for discriminating pulses within the transmitted signal. A threshold level, used to determine the occurrence of pulses, is set at an average signal level.

However, if the transmitted signal contains a pulse string that has a duty cycle that is much lower than fifty percent, the receiver/controller unit typically requires the use of a peak detector to discriminate the occurrence of pulses within the transmitted signal. A threshold level is set at some percentage of a peak value of the signal.

It is to be appreciated that an average detector does not perform well for low duty cycle signals and the peak detector does not perform well for high duty cycle signals. Thus, different hardware setups must be provided in the receiver/controller units, dependent upon the type of transmitted signal.

SUMMARY OF THE INVENTION

In accordance with one aspect, the present invention provides a receiver/controller apparatus for receiving an electromagnetic signal comprised of a plurality of pulses that convey a remote convenience function request, and for causing performance of the requested function. A comparator of the apparatus has a first input for receiving an electrical signal with an electrical characteristic that varies to convey the remote convenience function request. A second input of the comparator receives a threshold electrical characteristic value. An output of the comparator provides a signal that is indicative of the occurrence of the electrical characteristic of the electrical signal exceeding the threshold value and that conveys the remote convenience function request. The apparatus includes means for adjusting the threshold electrical characteristic value.

In accordance with another aspect, the present invention provides a receiver/controller apparatus for a remote convenience system. The apparatus is responsive to a remote convenience function request conveyed via an electromagnetic signal transmitted from a portable transmitter for controlling performance of an associated function. Antenna means picks-up the electromagnetic signal and outputs a respective, electrical antenna-output signal conveying the function request. Receive circuitry means of the apparatus processes the antenna-output signal and outputs an electrical signal that conveys the function request in response to the processing of the antenna-output signal. The receive circuitry means includes a comparator that has a first input for receiving an electrical signal with a voltage that varies to convey the remote convenience function request. A second input of the comparator receives a threshold voltage value. An output of the comparator provides a signal indicative of the occurrence of the voltage of the electrical signal exceeding the threshold voltage value. The receive circuitry means includes means for adjusting the threshold voltage value.

In accordance with another aspect, the present invention provides a method of receiving an electromagnetic signal comprised of a plurality of pulses that convey a remote convenience function request, and for causing performance of the requested function. The electromagnetic signal is picked-up. An electrical antenna-output signal conveying the function request is output. A first signal with a voltage is derived from the antenna-output signal. The voltage of the first signal varies to convey the remote convenience function request. A second signal that has a threshold voltage value is provided. The first and second signals are compared. An output signal that indicates the occurrence of the voltage of the first signal exceeding the threshold voltage value is provided to convey the function request. The threshold voltage value of the second signal is adjusted.

BRIEF DESCRIPTION OF THE DRAWINGS

The foregoing and other features and advantages of the present invention will become apparent to those skilled in the art to which the present invention relates upon reading the following description with reference to the accompanying drawings, wherein.

DESCRIPTION OF PREFERRED EMBODIMENTS

Figure 1:
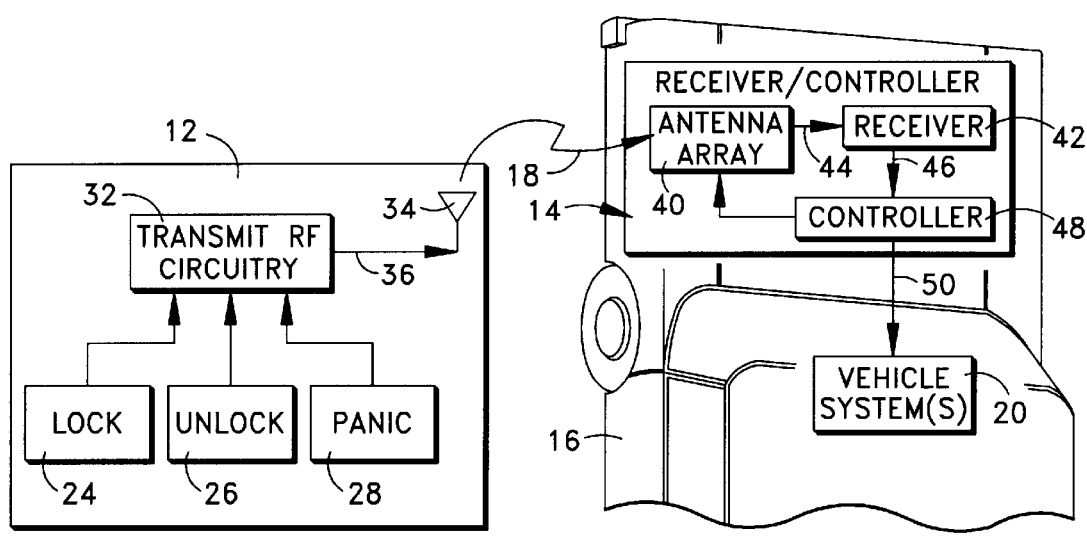
FIG. 1 is a schematic illustration of a remote convenience vehicle system in accordance with the present invention.

A remote convenience vehicle system 10 is schematically shown in FIG. 1. The system 10 includes a transmitter unit 12 and an associated receiver/controller unit 14 that is mounted in a vehicle 16. The transmitter unit 12 is operable to communicate, via an electromagnetic signal 18, with the receiver/controller unit 14 to achieve remote control performance of at least one convenience function (e.g., unlock doors) at a vehicle system 20 (e.g., vehicle door lock actuator) of the vehicle 16. The transmitter unit 12 is operated when it is desired to cause performance of the requested remote convenience function at the vehicle 16.

The transmitter unit 12 is a portable hand-held unit with a housing that encloses its electronic components. The transmitter unit 12 includes at least one manually actuatable pushbutton electric switch. In the example shown in FIG. 1, there are three pushbutton selector switches 24–28. A first pushbutton switch 24 and a second pushbutton switch 26 are associated with door lock and unlock functions, respectively. A third pushbutton switch 28 is associated with a vehicle alarm or "panic" function. It will be appreciated that the system 10 could be configured to control different remote convenience functions, and that the transmitter structure (e.g., the number, type, and the location of the pushbutton switches on the transmitter) would be accordingly different.

Each actuation or predefined series of actuations, of one of pushbutton switches (e.g., 24) of the transmitter unit 12 is a request to perform a corresponding predefined remote convenience function. For example, actuating pushbutton switch 24 is a request to lock the doors of the vehicle 16. The pushbutton switches 24–28 are operatively connected to a transmit radio frequency (RF) circuitry 32 within the housing of the transmitter unit 12. The transmit RF circuitry 32 is, in turn, operatively connected to a broadcast transmission antenna 34.

In response to pushbutton actuation, transmit RF circuitry 32 generates/assembles a "packet" of information to be transmitted. The transmission packet includes a start/wake-up portion, a security code, and at least one command that represents the remote function request. The transmit RF circuitry 32 then provides an appropriate electrical signal 36 that conveys the transmission packet to the antenna 34. In response to the stimulus of the electrical signal 36, antenna 34 broadcasts the signal 18, which is intended to be received by the receiver/controller unit 14 at the vehicle 16. Preferably, the transmitted signal 18 is a pulse-width-modulated (PWM) signal that has a radio frequency (RF) carrier frequency. It is to be appreciated that other signal types (e.g., frequency modulation, frequency shift key) can be used without deviating from the present invention.

Within the receiver/controller unit 14, an antenna array 40 is operatively connected to a receiver portion 42. The antenna array 40 provides a RF electrical signal 44 that conveys the contents (e.g., a security code and a function request message) of the transmitted signal 18 that has been received. The receiver portion 42 processes the conveyed information and provides a signal 46 to a controller portion 48. Specifically, in one preferred embodiment, the receiver portion 42 includes an amplifier, a mixer that beats the signal with a local oscillator signal, a buffer, and a bandpass filter. Thus, the signal is converted to an intermediate or baseband frequency having a plurality of pulses. Each pulse has amplitude that is dependent upon the strength of the transmitted signal 18.

Within the controller portion 48, the information-conveying pulses are processed to determine if the transmitted signal 18 includes a proper security code and to determine the function that is requested. If the transmitted signal 18 includes the proper security code, the controller portion 48 provides an appropriate signal 50 to the corresponding vehicle system 20 (e.g., door lock actuator system) to cause performance of the requested function.

With regard to the convenience functions that are remotely controlled via the system 10, the person of ordinary skill in the art will understand the vehicle systems 20 and the operation of such functions, as they are known in the art. Accordingly, detailed descriptions of such systems and functions are not provided herein and for brevity. Also, it will be appreciated that the present invention is applicable to other non-automotive, remotely controlled functions (e.g., garage door opening or entry light activation).

Within the receiver portion 42, the RF signal 44 provided from the antenna array 40 is converted to a lower frequency in order to permit processing. Accordingly, the receiver portion 42 includes a carrier frequency processing circuitry 54. In one example, the. carrier frequency processing circuitry 54 includes a front-end amplifier 56 that receives the RF signal 44 that is output from the antenna array 40. A signal 58 output from the amplifier 56 is provided as a first input to mixer 60. A local or reference oscillator 62 provides an oscillating signal 64 at a reference frequency as a second input to the mixer 60.

The mixer 60 combines the two input signals and outputs a signal 66 that has frequency component values that are at the sum and difference of the frequency values of the two input signals. In other words, the mixer 60 "beats" the first input signal 58 with the second input signal 64. The "difference frequency" value is at the IF frequency.

The carrier frequency processing circuitry 54 includes a buffer 68, a bandpass filter 70, and an amplifier 72 for handling the IF frequency signal output from the mixer 60. The buffer receives the signal 66 output from the mixer 60, and provides an output 74 to the bandpass filter 70. The bandpass of the filter 70 is centered on the IF frequency. Thus, other frequency components, such as the "sum frequency" produced in the mixer 60, are removed. The amplifier 72 amplifies a signal 76 output from the filter 70, and provides an IF signal 78, which is the output from the carrier frequency processing circuitry 54 and provided to a first node 80.

It is to be appreciated that the signal 78 is comprised of a series of pulses that convey the contents (e.g., start portion, security code, function request) of the transmitted signal 18. Each pulse of the signal 78 has amplitude that is dependent upon signal strength. Preferably, amplitude is represented by voltage amplitude.

The signal 78 output from the carrier frequency processing circuitry 54 must be further processed to differentiate between pulses that convey information and pulses that are the result of noise and the like. Also, this further processing permits transmitted signals 18 that have insufficient strength to be ignored by the receiver/controller unit 14. Thus, only pulses that meet certain criterion are passed along to the controller portion 48 for decoding, etc. The criterion used to screen-out certain pulses is adjustable and is provided by the structure set forth below.

The first node 80 is connected to a first input terminal of the comparator 82, and the signal 78 is provided as a first input to the comparator. A second node 84 is connected to a second input terminal of the comparator 82, and a reference voltage is supplied as a second input signal 86 to the comparator. When the voltage amplitude of the first input signal 78 is greater than the voltage amplitude of the second input signal 86, the output of the comparator 82 is a HIGH. The duration of the HIGH is dependent upon the time that the pulse voltage exceeds the reference voltage (i.e., generally equal to the duration of the pulse of the first input signal 78). When the voltage amplitude of the first input signal 78 is less than the reference voltage of the second input signal 86, the output of the comparator 82 is LOW. Thus, the reference voltage is a threshold value.

The reference voltage at the second node 84 is the voltage across a capacitor 88 that is connected between the second node and electrical ground. Electrical energy is supplied to the second node 84 by a regulated voltage source voltage source $V_{cc}$ (e.g., a battery of the vehicle 16 and regulation circuitry) connected to the second node 84 via a resistor 90.

The first and second nodes 80 and 84 are connected together via a resistor 92. Thus, the first input signal 78 is capable of influencing the reference voltage at the second node 84. It is to be appreciated that the amount of influence caused by the first input signal 78 is dependent upon pulse duration and pulse voltage amplitude of the first input signal.

In order to compensate for the influence, a microprocessor 100 is provided. The microprocessor 100 has the capability to either draw current from or supply current to the second node 84. The microprocessor 100 is connected, via a line 102, to the second node 84 to monitor the reference voltage. A current-supply terminal 104 of the microprocessor 100 is connected to the second node 84 via a diode 106 and a resistor 108. A current-sink terminal 110 of the microprocessor 100 is connected to the second node 84 via a diode 112 and a resistor 114. Thus, the reference voltage of the second input signal 86 is controlled by the microprocessor 100. The current flow between the microprocessor 100 and the second node 84 can maintain the reference voltage despite influence of the first input signal 78. Thus, threshold saturation (i.e., the reference voltage rising toward the level of the pulse amplitude) and threshold depletion (i.e., the reference voltage sinking to the signal noise floor) are avoided.

The current flow between the microprocessor 100 and the second node 84 can also change (increase or decrease) the reference voltage to a new level. Decreasing the reference voltage results in a weaker signal (i.e., with lower amplitude pulses) being permitted to "pass" the comparator 82. Increasing the reference voltage results in the opposite effect. This provides an ability to accept certain signals and to ignore other certain signals, dependent upon signal strength.

During operation, when the first input signal 78 goes HIGH at the beginning of a pulse, a certain amount of electrical energy flows through the resistor 92 to add charge to the capacitor 88. Similarly, when the first input signal 78 goes LOW, electrical energy from the capacitor 88 can flow through the resistor 92 and discharge the capacitor.

If the reference voltage at the second node 84 is not controlled, the duty cycle of the first input signal 78 may cause a migration of the reference voltage value away from its intended amount. Specifically, if the duty cycle of the first input signal 78 is close to fifty percent, the signal-induced charge time (i.e., the time that the signal 78 adds charge to the capacitor 88 during each pulse) has about the same duration as the signal-induced discharge time (i.e., the time that charge is detracted from the capacitor 88 during the absence of a pulse). Thus, the reference voltage level would not tend to migrate. However, if the duty cycle of the first input signal 78 is much higher than fifty percent, the charge time is much longer than the discharge time. The result is that the reference voltage at the second node 84 migrates to a higher level. It is possible that the reference voltage (i.e., the threshold level) could reach the level of the pulse HIGH value of the first input signal 78. At this point, the data would be corrupted by any noise on the first input signal 78. If the duty cycle of the first input signal 78 is much lower than fifty percent, the charge time would be much less than the discharge time. The reference voltage would decay toward a noise floor. Again, noise would be a corrupting factor.

However, in the present invention, the microprocessor 100 monitors the reference voltage and can provide an offsetting charging energy, via the terminal 104, or drain energy, via the terminal 110, to hold the reference voltage at a near constant level. Further, as noted above, the microprocessor 100 can be used to adjust the reference voltage to a new level and hold the new level for the entire comparison process. This is accomplished without changing any of the circuitry. Specifically, without changing any of the values of the resistors or the capacitor. Thus, the receiver portion 42, in accordance with the present invention, can be used with transmitter units that have different signal duty cycles and different signal strengths. Also, different control ranges can be established.

Figure 2:
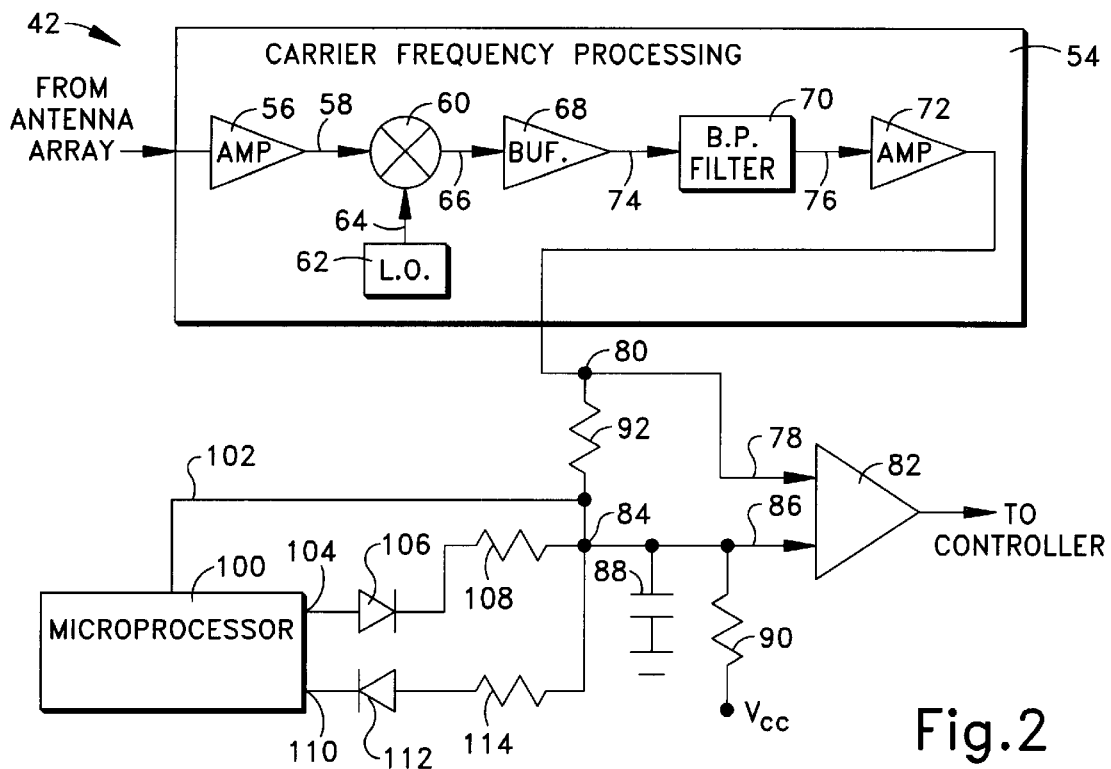
FIG. 2 is a schematic illustration of a first embodiment of-a receiver portion within a receiver/controller unit of the system of FIG. 1.
Figure 3:
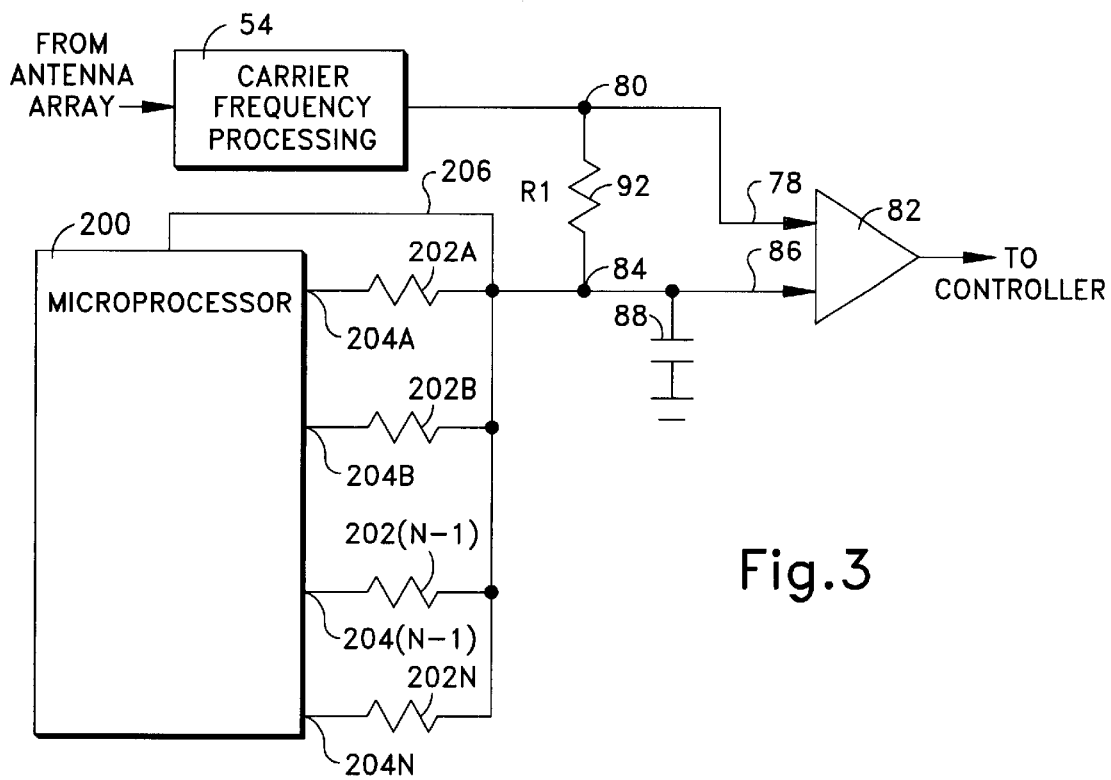
FIG. 3 is a second embodiment of the receiver portion.

FIG. 3 illustrates a second embodiment of the receiver portion in accordance with the present invention. The receiver portion of FIG. 3 is designated 42' and is similar to the receiver portion 42 of FIG. 2. Structures that are identical for the two embodiments are identified by identical reference numerals.

The second embodiment of the receiver portion 42' (FIG. 3) differs from the first embodiment in that electrical energy is not provided via the source $V_{cc}$ and resistor 90 of the first embodiment shown within FIG. 2. Instead, the second node 84 (FIG. 3) is connected to a bank of parallel resistors 202A–202N. Each of the resistors 202A–202N has a different resistance value. For example, resistor 202A may be 1M ohms, 202B may be 2M ohms (i.e., double), etc. Each of the resistors 202A–202N is connected to a respective terminal (e.g., 204A) of a microprocessor 200.

Each of the terminals 204A–204N may output electrical energy that is transferred, via its associated resistor, to the second node 84. The different resistor values result in different amounts of electrical energy provided from each terminal. Accordingly, dependent on which terminals 204A–204N of the microprocessor 200 are activated to output electrical energy, a variable amount of electrical energy is provided to the second node 84 to charge the capacitor 88. Thus, the resistor network acts as a digital-to-analog converter.

One or more diodes (not shown) can be added to control the flow of current. The microprocessor 200 is connected, via a line 206, to the second node 84 to monitor the reference voltage.

In addition, the terminals 204A–204N of the microprocessor 200 can permit current to flow into the microprocessor from the second node 84 (i.e., the microprocessor can act as a current sink). The amount of current that flows at each of the terminals 204A–204N is dependent upon the value of the associated resistor. Accordingly, the amount of total energy drawn from the second node 84 by the microprocessor 200 is dependent upon which terminals of the microprocessor are activated to draw current. One or more diodes (not shown) can be added to control the flow of current.

Thus, it is to be appreciated that electrical energy can flow from the microprocessor 200 to the second node 84, or from the second node to the microprocessor. Thus, the reference voltage value at the second node 84 is provided and adjusted by the microprocessor 200. Adjustment can be for either maintaining a constant reference voltage value, or to change the reference voltage value for the entire signal duration.

From the above description of the invention, those skilled in the art will perceive improvements, changes and modifications. Such improvements, changes and modifications within the skill of the art are intended to be covered by the appended claims.

Having described the invention, the following is claimed:

1. A receiver/controller apparatus for receiving an electromagnetic signal comprised of a plurality of pulses that convey a remote convenience function request, and for causing performance of the requested function, said apparatus comprising:
   a comparator having a first input for receiving an electrical signal with an electrical characteristic that varies to convey the remote convenience function request, a second input for receiving a threshold electrical characteristic value, and an output for providing a signal indicative of the occurrence of the electrical characteristic of the electrical signal exceeding the threshold value that conveys the remote convenience function request; and
   means for adjusting the threshold electrical characteristic value including means for monitoring the threshold electrical characteristic value and means, responsive to the monitored threshold electrical characteristic value, for adding current to the second input to increase the threshold electrical characteristic value and for drawing current from the second input for decreasing the threshold electrical characteristic value.

2. An apparatus as set forth in claim 1, wherein the electrical characteristic is voltage amplitude.

3. An apparatus as set forth in claim 1, wherein said means for adjusting also includes a microprocessor.

4. An apparatus as set forth in claim 3, wherein said microprocessor includes means for controlling current flow between said second input of said comparator and said microprocessor, said means for controlling being responsive to the first input signal.

5. An apparatus as set forth in claim 4, wherein said means for adjusting includes a resistor network connected between said second input of said comparator and said microprocessor.

6. An apparatus as set forth in claim 5, wherein said microprocessor includes a terminal that is operable for outputting current and a terminal operable for drawing current.

7. An apparatus as set forth in claim 5, wherein said microprocessor includes a plurality of terminals, each terminal is operable for outputting current and for drawing current, a resistor of said resistor network is connected to each of said terminals, each of said resistors has a different resistive value.

8. An apparatus as set forth in claim 1, including a capacitor connected between said second input of said comparator and electrical ground, a voltage value on the capacitor provides the threshold electrical characteristic value.

9. An apparatus as set forth in claim 1, wherein said means for adjusting includes means responsive to the electrical signal conveying the remote function request for adjusting the threshold electrical characteristic value.

10. A receiver/controller apparatus for a remote convenience system, said apparatus being responsive to a remote convenience function request conveyed via an electromagnetic signal transmitted from a portable transmitter for controlling performance of an associated function, said apparatus comprising:
    antenna means for picking-up the electromagnetic signal and for outputting a respective, electrical antenna-output signal conveying the function request;
    receive circuitry means for processing the antenna-output signal and for outputting an electrical signal conveying the function request in response to the processing of the antenna-output signal, said receive circuitry means including a comparator having a first input for receiving an electrical signal with a voltage that varies to convey the remote convenience function request, a second input for receiving a threshold voltage value, and an output for providing a signal indicative of the occurrence of the voltage of the electrical signal exceeding the threshold voltage value, and means for adjusting the threshold voltage value including means for monitoring the threshold voltage value and means, responsive to the monitored threshold voltage value, for adding current to the second input to increase the threshold voltage value and for drawing current from the second input for decreasing the threshold voltage value.

11. An apparatus as set forth in claim 10, wherein said means for adjusting also includes a microprocessor.

12. An apparatus as set forth in claim 11, wherein said microprocessor includes means for controlling current flow between said second input of said comparator and said microprocessor.

13. An apparatus as set forth in claim 12, wherein said means for adjusting includes a resistor network connected between said second input of said comparator and said microprocessor.

14. An apparatus as set forth in claim 10, including a controller, operatively connected to said comparator, for processing information contained in the signal provided by said comparator to determine the remotely requested function, said controller is operatively connected to a vehicle system and provides a signal to the vehicle system to cause performance of the remotely requested function by the vehicle system.

15. A method of receiving an electromagnetic signal comprised of a plurality of pulses that convey a remote convenience function request, and for causing performance of the requested function, said method comprising:

picking-up the electromagnetic signal;

outputting a respective, electrical antenna-output signal conveying the function request;

deriving a first signal with a voltage that varies to convey the remote convenience function request from the antenna-output signal;

providing a second signal having a threshold voltage value;

comparing the first and second signals;

providing an output signal that indicates the occurrence of the voltage of the first signal exceeding the threshold voltage value to convey the function request;

monitoring the threshold voltage value of the second signal; and adjusting the threshold voltage value of the second signal by adding current to the second signal for increasing the threshold voltage value and drawing current from the second signal for decreasing the threshold voltage value.

16. A receiver/controller apparatus for receiving an electromagnetic signal comprised of a plurality of pulses that convey a remote convenience function request, and for causing performance of the requested function, said apparatus comprising:

a comparator having a first input for receiving an electrical signal with an electrical characteristic that varies to convey the remote convenience function request, a second input for receiving a threshold electrical characteristic value, and an output for providing a signal indicative of the occurrence of the electrical characteristic of the electrical signal exceeding the threshold value that conveys the remote convenience function request; and means for adjusting the threshold electrical characteristic value, wherein said means for adjusting includes a microprocessor, wherein said microprocessor includes means for controlling current flow between said second input of said comparator and said microprocessor, wherein said means for adjusting includes a resistor network connected between said second input of said comparator and said microprocessor, and wherein said microprocessor includes a terminal that is operable for outputting current and a terminal operable for drawing current.

* * * * *